(12) United States Patent
Xing et al.

(10) Patent No.: US 11,567,837 B2
(45) Date of Patent: Jan. 31, 2023

(54) JOURNALING DATA RECEIVED IN A CLOUD-BASED DISTRIBUTED COMPUTING ENVIRONMENT

(71) Applicant: Panzura, Inc., Campbell, CA (US)

(72) Inventors: Jian Xing, Pleasanton, CA (US); Qian Zhang, Sunnyvale, CA (US); Pu Paul Zhang, San Jose, CA (US)

(73) Assignee: Panzura, LLC, Plano, TX (US)

( * ) Notice: Subject to any disclaimer, the term of this patent is extended or adjusted under 35 U.S.C. 154(b) by 648 days.

(21) Appl. No.: 16/510,916

(22) Filed: Jul. 13, 2019

(65) Prior Publication Data
US 2020/0065199 A1 Feb. 27, 2020

Related U.S. Application Data

(63) Continuation-in-part of application No. 16/216,890, filed on Dec. 11, 2018, now Pat. No. 11,178,246.

(60) Provisional application No. 62/722,892, filed on Aug. 25, 2018.

(51) Int. Cl.
| | |
|---|---|
| *G06F 11/14* | (2006.01) |
| *G06F 16/27* | (2019.01) |
| *H04L 29/08* | (2006.01) |
| *H04L 67/1097* | (2022.01) |

(52) U.S. Cl.
CPC ........ *G06F 11/1471* (2013.01); *G06F 16/273* (2019.01); *H04L 67/1097* (2013.01); *G06F 2201/84* (2013.01)

(58) Field of Classification Search
USPC .......... 709/201–203, 220–226, 238–239 and, 709/245–246; 707/661
See application file for complete search history.

(56) References Cited

U.S. PATENT DOCUMENTS

| | | | |
|---|---|---|---|
| 7,814,367 B1 * | 10/2010 | Squibb | G06F 16/1873 707/648 |
| 9,152,578 B1 * | 10/2015 | Saad | H04L 63/0428 |
| 10,275,326 B1 | 4/2019 | Stickle et al. | |
| 2011/0225229 A1 * | 9/2011 | Srivastava | G06Q 50/00 709/206 |
| 2014/0280499 A1 | 9/2014 | Basavaiah et al. | |

(Continued)

*Primary Examiner* — Younes Naji
*Assistant Examiner* — Da T Ton
(74) *Attorney, Agent, or Firm* — Mark Spiller

(57) ABSTRACT

The disclosed embodiments disclose techniques for journaling data received in a cloud-based distributed computing environment (CBDCE). Multiple services simultaneously execute on the CBDCE compute nodes, with each service comprising multiple service instances that simultaneously execute on multiple, distinct compute nodes of the CBDCE. The CBDCE includes a distributed database that enables coordination between the service instances of services that execute in the CBDCE; this distributed database also includes multiple distributed database instances that simultaneously executing on multiple different CBDCE compute nodes. During operation, a service instance executing on one of these compute nodes receives a client request. The service instance submits this client request to a distributed database instance and, in parallel, also submits the client request and its associated user data to a distributed journaling service.

14 Claims, 11 Drawing Sheets

(56) References Cited

U.S. PATENT DOCUMENTS

2017/0123675 A1 5/2017 Glazemakers
2017/0308547 A1* 10/2017 Gupta .................. G06F 16/178

* cited by examiner

JOURNALING DATA RECEIVED IN A CLOUD-BASED DISTRIBUTED COMPUTING ENVIRONMENT

RELATED APPLICATION

This application claims the benefit of U.S. Provisional Patent Application No. 62/722,892, by inventors Jian Xing, Qian Zhang, and John Richard Taylor, entitled "Managing Cloud-Based Storage Using a Time-Series Database," filed 25 Aug. 2018, which is incorporated herein by reference. This application is also a continuation-in-part application of U.S. patent application Ser. No. 16/216,890 filed on 11 Dec. 2018 by inventors Jian Xing, Qian Zhang, and Pu Paul Zhang, entitled "Managing Cloud-Based Storage Using a Time-Series Database", which also claims benefit of U.S. Provisional Patent Application No. 62/722,892.

BACKGROUND

Field of the Invention

This disclosure generally relates to techniques for providing flexible and extensible network storage systems. More specifically, this disclosure relates to techniques for managing a cloud computing environment.

Related Art

Enterprise data centers typically include large numbers of storage devices that can be accessed using high-speed networks. However, the management overhead involved in maintaining a large number of storage devices can become substantial. For instance, maintaining data consistency, redundancy, and storage system performance in the presence of hard drive failures can involve substantial time, effort, and expertise.

Cloud-based computing storage vendors attempt to simplify storage management by providing large-scale remote network computing and storage solutions. Such vendors can leverage economies of scale to provide extensive and flexible computation services and data storage capacity that can be leased and accessed by clients. Clients can leverage such cloud-based solutions to offload storage management overhead and to quickly and easily increase their data storage capacity and computing capabilities on an as-needed basis. However, the advantages of flexible cloud-based computing capabilities make them a valuable commodity that can command premium pricing. Furthermore, implementing and managing a cloud-based environment in which distributed services can interact in a scalable and flexible manner is challenging. For instance, clients may need detect and manage sudden, unexpected increases in business and/or storage traffic.

Hence, what is needed are techniques for managing cloud-based computing capabilities without the above-described problems of existing techniques.

SUMMARY

The disclosed embodiments disclose techniques for journaling data received in a cloud-based distributed computing environment (CBDCE). Multiple services simultaneously execute on the CBDCE compute nodes, with each service comprising multiple service instances that simultaneously execute on multiple, distinct compute nodes of the CBDCE. The CBDCE includes a distributed database that enables coordination between the service instances of services that execute in the CBDCE; this distributed database also includes multiple distributed database instances that simultaneously executing on multiple different CBDCE compute nodes. During operation, a service instance executing on one of these compute nodes receives a client request. The service instance submits this client request to a distributed database instance and, in parallel, also submits the client request and its associated user data to a distributed journaling service.

In some embodiments, submitting the client request to the distributed database involves waiting for a quorum of distributed database instances to confirm the client request. The client request and submitted user data could be irrecoverably lost prior to this confirmation if there is a failure in any of: (1) the specific CBDCE compute node; (2) the receiving service instance; and (3) a network connection associated with the specific CBDCE compute node. Submitting the client request and the set of user data to the distributed journaling service ensures that the client request and user data would survive such failures.

In some embodiments, the distributed journaling service comprises two or more journaling service instances that execute on distinct CBDCE compute nodes, with each journaling service instance leveraging persistent storage available on its respective CBDCE compute nodes to log client requests and associated user data. The journaling service instances collectively provide a shared storage pool that can be written to by any service executing in the CBDCE that needs logging services.

In some embodiments, the number of journaling service instances executing on distinct CBDCE compute nodes is adjusted dynamically based on the number and size of the logging requests that are collectively received and/or predicted by the distributed journaling service at a given instance in time.

In some embodiments, multiple journaling service instances that leverage limited amounts of general-purpose persistent storage available locally on their CBDCE nodes combine to provide a scalable distributed journal service without requiring additional, specialized dedicated storage resources.

In some embodiments, each journaling service instance is configured to use the distributed database to track its storage capacity and the set of logged data that it is currently storing. A monitoring service accesses the distributed database records associated with the journaling service instances to ensure that the throughput and capacity of the distributed journaling service scale based on demand. The monitoring service monitors the overall set of available log space available in the CBDCE and the current logging load to instantiate additional or release existing journal service instances based on the current logging needs in the CBDCE.

In some embodiments, a policy agent service specifies the amount of redundancy needed for logging based on the topography and/or the scale of the cluster and the importance of the data that is being logged. The service instance is configured to submit the client request and the set of user data redundantly in parallel to a specified number of multiple journaling service instances to reduce the probability of losing the logged data due to failures.

In some embodiments, determining a set of potential target journaling service instances for the service instance involves considering the availability, storage size, read and write latency, network bandwidth, and storage bandwidth for the CBDCE compute nodes hosting the potential target journaling service instances.

In some embodiments, the system detects a failure in at least one of the specific CBDCE compute node, the service instance, or the network connection, and recovers the user request and the set of user data from the distributed journaling service.

In some embodiments, recovering the user request and the set of user data from the distributed journaling service involves instantiating a recovery service that: (1) accesses the distributed database records associated with the journaling service to determine a set of log records that are associated with the identifiers of failed nodes and service instances; and (2) contacts journal service instances that are storing the set of log records to reconstruct and process any client requests that were not successfully completed before the failure.

In some embodiments, logged data and client requests are only needed for a limited timeframe. After the client request has been processed and any results have been successfully written to a high-reliability storage system, the logged data is freed from the distributed journaling service using a distributed background garbage collection service that scans the distributed database records that are associated with the journaling service instances to free up logged data that is no longer needed, thereby enabling an abstraction of a journaling service with infinite storage space.

In some embodiments, the distributed background garbage collection service flushes logged data that is no longer actively needed from the journaling service instances to a separate dedicated storage device for tracking purposes. This process includes writing metadata that indexes the location of the flushed logged data in the separate dedicated storage device to the distributed database to facilitate future lookups of logged client requests and user data.

DETAILED DESCRIPTION

Figure 1:
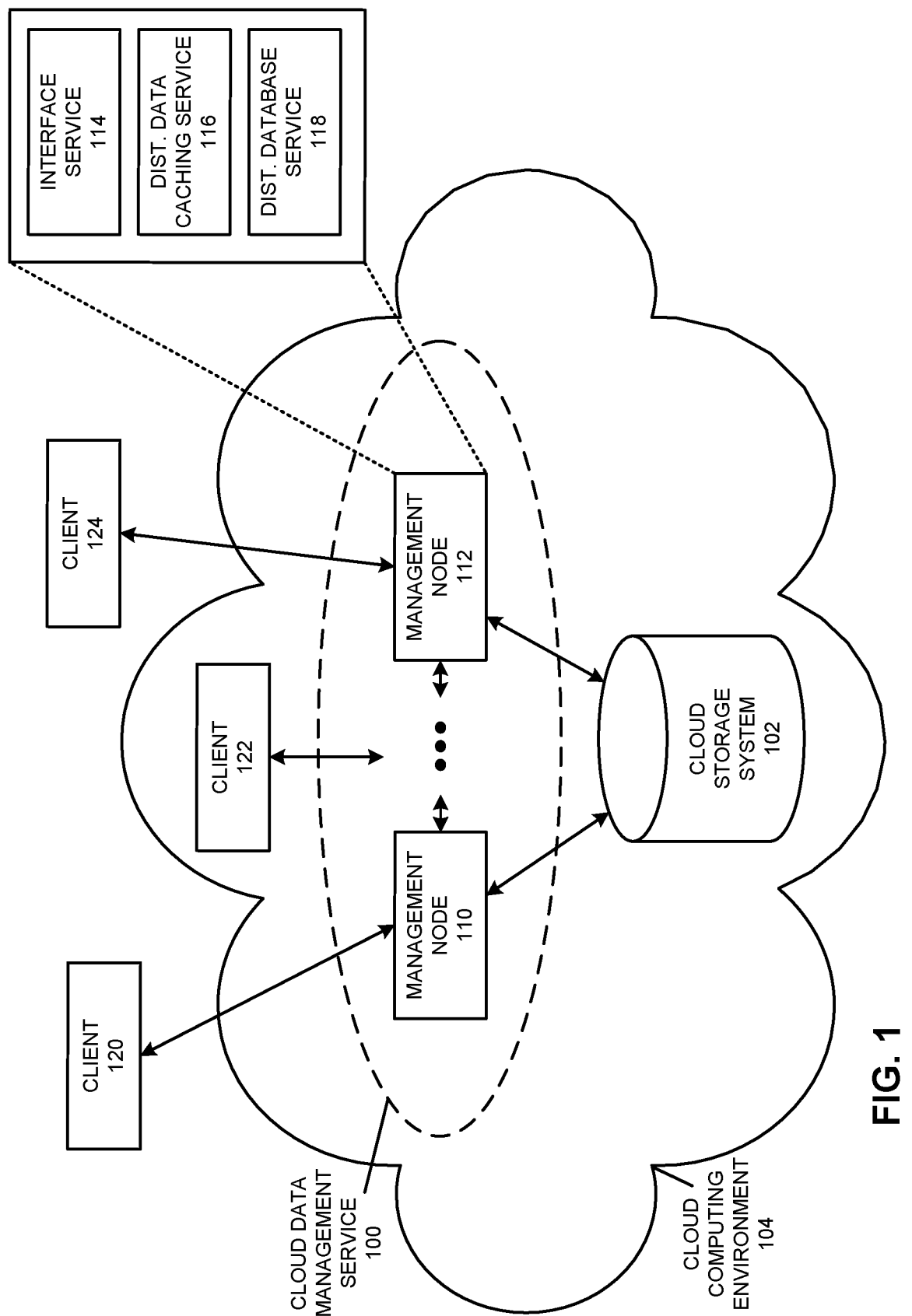
FIG. 1 illustrates an exemplary scenario in which a cloud data management service manages data flows between clients and a cloud storage system in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Leveraging Cloud-Based Storage

Storage scalability can become problematic for enterprises when data needs out-scale the capabilities of a datacenter. While storage capacity can be over-provisioned, failures or unanticipated volumes of data traffic can cause situations where new storage devices cannot be brought online quickly enough to satisfy data demands. A number of "cloud-based storage" vendors (also sometimes referred to as "cloud storage providers") attempt to simplify storage management by providing large-scale network storage solutions. Such vendors leverage economies of scale to provide data centers with extensive data storage capacity that can then be rented and accessed by clients, thereby allowing clients to offload storage management overhead and easily increase their data storage allotment on an as-needed basis. Clients can store and retrieve data via well-known data access APIs (application programming interfaces) (e.g., the Amazon S3 API).

The advantages of flexible cloud-based data storage capacity make it a valuable commodity that can command premium pricing. For instance, cloud computing vendors may provide clients with an initial fixed amount of data storage space that can grow with client needs, and then charge substantial storage fees when additional flexible storage space is actually used. Such additional storage costs may be worth the additional expense for clients experiencing a sudden increase in business and/or storage traffic (especially in comparison with running out of storage space!), but can substantially increase client costs. Cloud computing vendors providing these services have incentive to increase the value of storage capabilities by adding additional capabilities (e.g., improving durability, availability and scalability, and building in-cloud machine learning capabilities that can operate upon data stored in their cloud storage services and hence encourage clients to use more cloud data storage capacity), but do not have much incentive to apply techniques that reduce the amount of data that is stored in a cloud storage services (because this would reduce their profits).

In some embodiments, a distributed cloud data management system operates as a layer on top of a cloud storage system. This cloud data management system provides a number of additional services that can include: 1) enabling deduplication of data being stored in the cloud storage system; 2) building enhanced distributed filesystem abstractions on top of the cloud object storage API; and 3) providing additional capabilities that extend an underlying cloud object storage system (e.g., clone, roll-back, and snapshot functionalities).

FIG. 1 illustrates an exemplary scenario in which a cloud data management service 100 manages data flows between clients 120-124 and a cloud storage system 102. Cloud storage system 102 and cloud data management service 100 operate in a cloud computing environment 104, and can provide data services to clients that execute both inside (client 122) and outside (clients 120 and 124) of the cloud computing environment 104. Cloud data management service 100 comprises multiple management nodes 110-112 that execute services that interact with each other and cloud storage system 102 to provide data management services and service client requests.

In some embodiments, each management node (e.g., 110-112) may execute multiple services that comprise one or more "layers of functionality." For instance, an interface service 114 (sometimes also referred to as the access layer, or access service) may execute a number of "docker containers" that can accept client data requests via a wide range of different protocols (e.g., including, but not limited to, a native cloud object protocol such as the Amazon S3 interface, as well as other data access APIs such as Hadoop, NTFS, and CIFS). Docker containers (or "dockers") provide a lighter-weight solution (as compared to separate virtual machines, or "VM"s) that facilitates automating the deployment of multiple related applications (sometimes referred to as "microservices") inside distinct software containers that all operate within a single virtual machine and can communicate with each other using standard networking protocols (e.g., via Linux namespaces and IP-layer network protocols). Allowing independent containers to run within a single virtual machine avoids the cost and overhead of starting and maintaining multiple virtual machines. Note that such docker containers execute in isolation and leverage operating system kernel resources to communicate; containers can be provisioned and provided with an abstraction of their own process space and interfaces, and can be constrained to use a specific defined amount of resources (e.g., CPU, memory, and network or other I/O bandwidth).

In some embodiments, data received via interface service 114 is then processed by a distributed data caching service 116. For instance, each distributed data caching service 116 may: 1) break received data into regular-sized (e.g., 4 KB) blocks; 2) cache received and/or requested data blocks; and 3) perform deduplication upon new blocks received from clients. Breaking received data into smaller data blocks and performing deduplication may involve using additional compute resources, but the cost of extensible cloud data storage (e.g., elastic block storage, or EBS, in the S3 environment) is typically much higher than the cost of leveraging additional computing capabilities in the cloud computing environment, so this trade-off is often beneficial if there are likely to be duplicate data blocks in received data sets.

In some embodiments, a distributed database service 118 on multiple management nodes stores metadata for data that is being managed by cloud data management service 100. For instance, distributed database service 118 may be used to track which management nodes are currently caching which specific blocks of data, so that cached data can be efficiently accessed from a peer node instead of cloud storage system 102 when possible. Furthermore, multiple instances of distributed database service 118 on different nodes may be configured to serve as a "time-series database" that tracks how data stored to cloud storage system 102 via cloud data management service 100 has evolved over time and provides additional data capabilities that enhance cloud storage system 102; such capabilities are described in more detail in the following section. The multiple instances of distributed database service 118 may also be used to manage and/or load-balance other services (not shown) that execute on the management nodes of cloud data management service (also described in more detail in a following section).

In summary, a cloud data management service tracks, transforms, and caches data received from clients and then stores this data into any cloud storage system (i.e., the disclosed techniques are not tied to any particular cloud storage vendor). This stored data can then subsequently be accessed by cloud or non-cloud clients, for instance to perform data analytics, indexing, or any other desired processing. Note that, as illustrated in FIG. 1, cloud data management service 100 is a distributed platform. For example, multiple clients may simultaneously interact with dockers in the interface services 114 of different management node, and all instances of distributed database services 118 that are executing across the cluster of management nodes communicate and work cooperatively to provide a scalable and fault-tolerant data management service. To this end, cloud data management service 100 may require at least three management nodes to provide redundancy and support a quorum-based update technique, and typically will scale to a substantially larger number of management nodes to support large-scale, geographically-distributed applications.

Providing Object Capabilities Using a Time-Series Database

As described in the previous section, a cloud-based data management service can be wrapped around a cloud storage system to provide additional storage capabilities and store data more compactly. Cloud storage systems often perform storage operations at the granularity of "objects," i.e. opaque blobs of data that are simpler than and support fewer operations than files, and hence are easier to scale horizontally. The contents and format of each object may be application specific, and objects may be stored in a hierarchy. For instance, the Amazon S3 cloud storage system has a concept of folders and buckets into which groups of objects can be stored. Some applications may be implemented to consider and store files as objects, while other applications may be implemented to structure and access objects differently from files. Note that the object abstraction is different from a file-based approach—files in a typical filesystem may be truncated or modified/rewritten frequently. Objects more typically will not be modified; instead, a new version of the object is created. Hence, while a filesystem will typically only include one most-recent version of a file, an object store may store multiple versions of the same object over time.

In some embodiments, a cloud-based data management service leverages a distributed database (e.g., Apache Cassandra) to provide additional capabilities and filesystem abstractions on top of an object-based cloud storage system. More specifically, the distributed database serves as a "time-series database" that tracks whenever objects are created or updated. Tracking object operations enables queries and capabilities that depend on being able to identify the existence, state, and version of stored objects at a certain timeframe. For example, additional "bucket-level" object-store capabilities that are enabled by a time-series database include snapshot, cloning, and roll-back operations. Snapshots allow applications to record object state at specified points in time, while cloning creates a (virtual) duplicate copy of a set of objects. Roll-backs allow applications to revert to an earlier set of objects (or a cloned set of objects) if desired.

Figure 2:
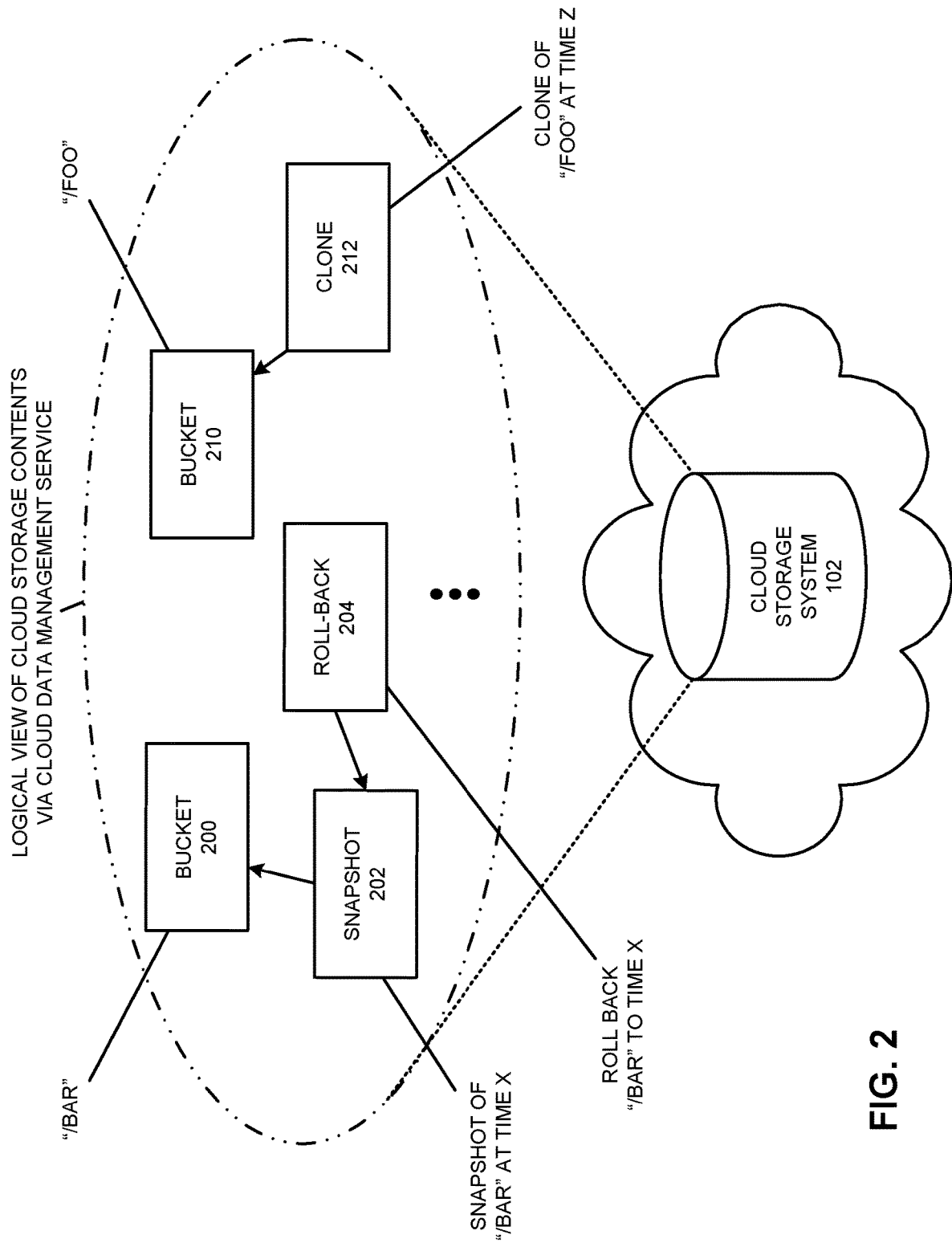
FIG. 2 illustrates an exemplary logical view of cloud storage contents from the perspective of a cloud management service that uses a time-series database to manage objects stored in cloud storage system in accordance with an embodiment.

FIG. 2 illustrates an exemplary logical view of the contents of a cloud storage system from the perspective of a cloud management service that uses a time-series database to manage objects stored in cloud storage system 102. In the context of one exemplary cloud storage system, objects can be grouped in hierarchical levels buckets based on object names (e.g., with backslashes or slashes indicating hierarchy, as in many filesystems). In the scenario of FIG. 2, the cloud management service manages and tracks operations upon objects in two top-level buckets 200 and 210 named "/BAR" and "/FOO," respectively.

During operation, client applications operating upon these buckets send requests to add new objects to buckets and access existing objects in buckets. As the cloud data management service receives such requests it updates the tables of the time-series database (i.e., in the distributed database services 118 of the management nodes of FIG. 1) to include time stamps and other tracking information associated with the requests, including but not limited to the objects and buckets associated with the requests and the object data included in the requests (if any). Note that for these types of requests the cloud data management service provides an API that is substantially the same as that of the cloud storage system(s) upon which it is layered, although the cloud data management service does not necessarily just pass these requests through as-is to underlying cloud storage system 102, but may perform additional operations upon them (e.g., fragment object data for deduplication purposes and create multiple distinct fragmented objects in the cloud storage system instead of one object as received). In addition, the cloud data management service also supports additional APIs that enable client applications to invoke the additional capabilities offered by the cloud data management service.

The logical view in FIG. 2 includes several additional buckets that were created and/or supported by the cloud data management service in association with the /BAR bucket 200 and the /FOO bucket 210. These buckets include a snapshot 202 of the /BAR bucket 200 at a specific time X, a roll-back 204 that rolls back bucket 200 to another specific time Y, and a clone of bucket 210 to a third time Z. These buckets, their relation to their parent buckets, and their use are described in more detail in the following paragraphs.

Figures 3A, 3B:
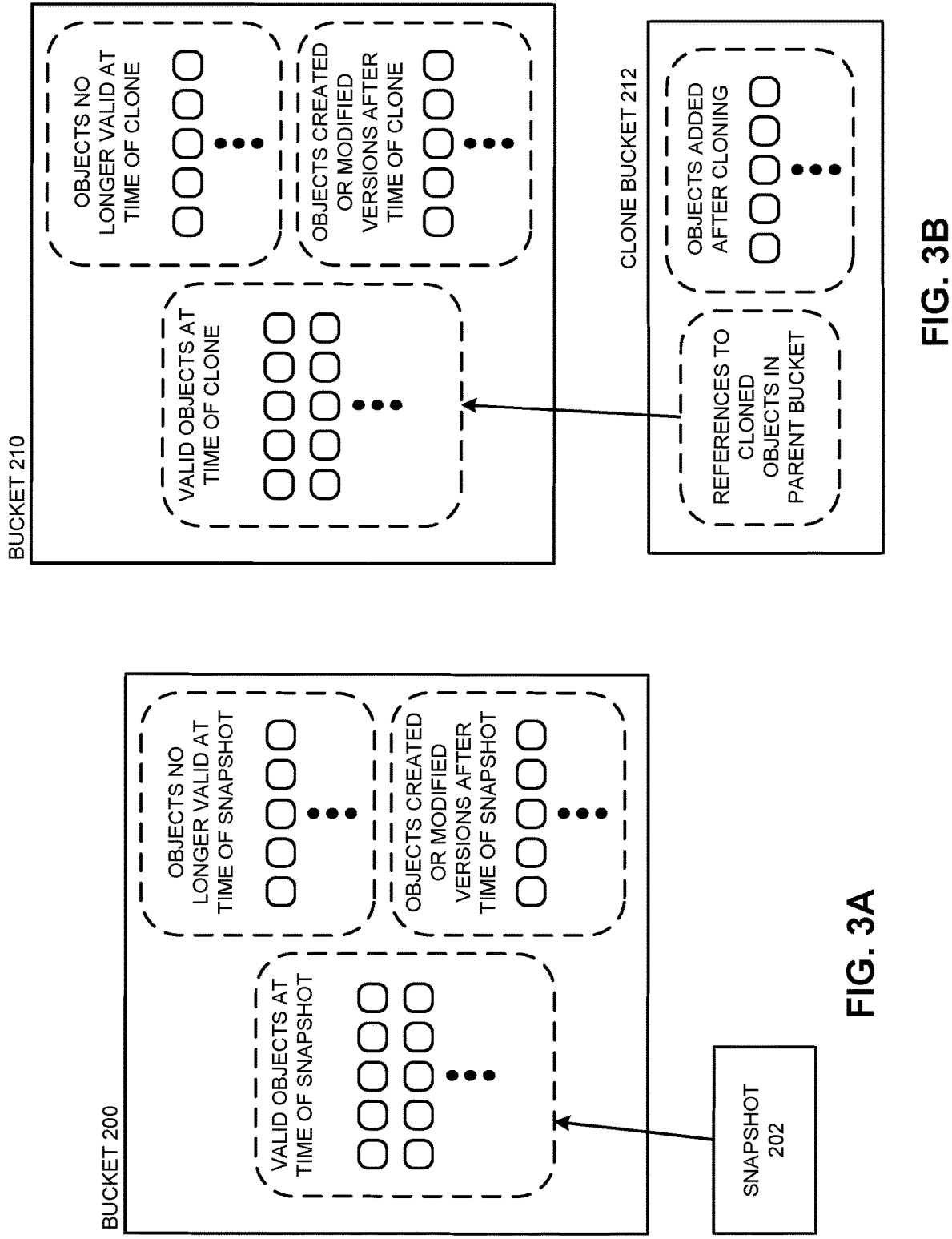
FIG. 3A illustrates a logical view of how a time-series database can logically track the set of valid object references for a snapshot operation in accordance with an embodiment.
FIG. 3B illustrates a logical view of how a time-series database can track the set of valid object references for a clone operation in accordance with an embodiment.

In some embodiments, a time-series database enables performing snapshots upon an object store at specified times, thereby allowing clients to subsequently access those objects as if they were accessing the object store at those specific points in time. The time-series database stores a set of metadata that enables this functionality while minimizing the amount of data that needs to be stored in the underlying cloud storage system to support such capabilities. Consider, for instance, the snapshot 202 taken at time X of the /BAR bucket 200 that is illustrated in FIG. 2. The cloud management service can leverage the time-series database to make snapshot 202 appear as another independent bucket that contains the specified data, but then leverage the contents of bucket 200 so that objects do not need to be copied (and hence do not consume additional space). FIG. 3A illustrates a logical view of the time-series database maintaining a set of tables for snapshot 202 that refer to the set of valid objects in bucket 200 at the specified time of the snapshot (time X). Note that bucket 200 also stores a set of objects that are no longer valid at the time of the snapshot, and may also receive and store other objects that are added after the time of the snapshot; the time-series database maintains records of these additional objects for bucket 200, but look-ups based on time-series history would determine that these objects are not relevant in the context of snapshot 202. A client accessing the snapshot bucket 202 via the cloud data management service would see the objects in the virtual bucket as if they were a separate, distinct bucket in cloud storage system 102.

In some embodiments, a time-series database enables cloning collections of objects, thereby effectively creating a snapshot that can also still be extended independently of the original parent bucket (e.g., "forked"). As described for snapshots above, the time-series database stores a set of metadata that enables this functionality while minimizing the amount of duplicate data that needs to be stored in the underlying cloud storage system. More specifically, the time-series database operation can support copy-on-write cloning, so that all objects that exist at the time of cloning can be referenced via the parent bucket, while new objects that are stored after the cloning operation are stored and accessed from the clone bucket. Hence, at the time a bucket is cloned, the cloud data management system may create a new bucket and write a record in the time-series database to indicate that the parent bucket has been cloned, but does not actually copy any of the cloned objects to the clone bucket (e.g., the clone bucket in the cloud storage system will start out empty, or might not even be actually created until a first new object is written to the clone bucket). Note that these copy-on-write semantics allow clone operations to execute very quickly, because such operations do not need to wait for copy operations to complete.

FIG. 3B illustrates a parent bucket (/FOO bucket 210) and a clone bucket (clone bucket 212, which clones the /FOO bucket 210 at time Z). A client attempting to access objects needs to specify a target starting bucket that will determine the search path for the object; for the example of FIG. 2, when a client requesting an object specifies clone bucket 212, the cloud data management service uses the object metadata stored in the time-series database to determine whether the requested object should be retrieved directly from clone bucket 212 or if it is stored in (and should be retrieved from) parent bucket 210. Note that cloned buckets may have multiple levels of ancestors; records can be written to the time-series database that indicate this hierarchy and multiple levels of parent buckets, and this metadata can be traversed to find the correct bucket for a desired object based on the context of the request (e.g., the target starting bucket and an object path/identifier). Note that new objects will also be written to the specified bucket based on the bucket that is specified in the request. For instance, in the example of FIGS. 2 and 3B, clients accessing bucket 210 directly will store new objects there, while clients that access clone bucket 212 will store new objects in clone bucket 212. Note that cloning affects the deletion of objects, because an object being deleted in the context of a parent bucket may still be valid and accessible in a clone bucket. The time-series database can be configured to track deleted objects; for instance, when a client accessing the parent bucket directly deletes an object, the metadata in the time-series database may be updated to indicate that object no longer exists and cannot be accessed in the context of (direct accesses to) the parent bucket, but that same object may still be accessible if accessed from an earlier snapshot or via clone buckets that refer back to the parent bucket. Deleted objects may also be preserved even if not accessed by snapshots or clone buckets, to still allow roll-back operations (described below) to an earlier time in which those objects still existed.

In some embodiments, a time-series database leverages aspects of snapshots and cloning capabilities to support roll-back operations that allow clients to undo operations and return to an earlier object- and bucket-state. As described above, a time-series database can be used to track when objects are created and updated, which enables searching for versions of objects that were valid at any specified time. These capabilities allow the cloud data management service to create (and re-create) snapshot and clone buckets for previous points in time, thereby enabling the ability to create a roll-back bucket that reflects the state of a given bucket at some previous point in time. In some embodiments the cloud data management service can use the time-series database to reconstruct object state at any user-requested time (e.g., go back in time to that specified time by accessing object time-stamps in the time-series database to create a snapshot bucket for that specific time), while in some other embodiments the set of roll-back options may be limited to finding a snapshot of the bucket that is closest in time to the request (potentially with a user choice of whether the closest preceding or subsequent snapshot would be preferred as well). As described for the cloning operation above, a roll-back operation may create a new bucket that points to the selected snapshot but use copy-on-write techniques to ensure that the operation does not involve copying any existing objects.

Figure 3C:
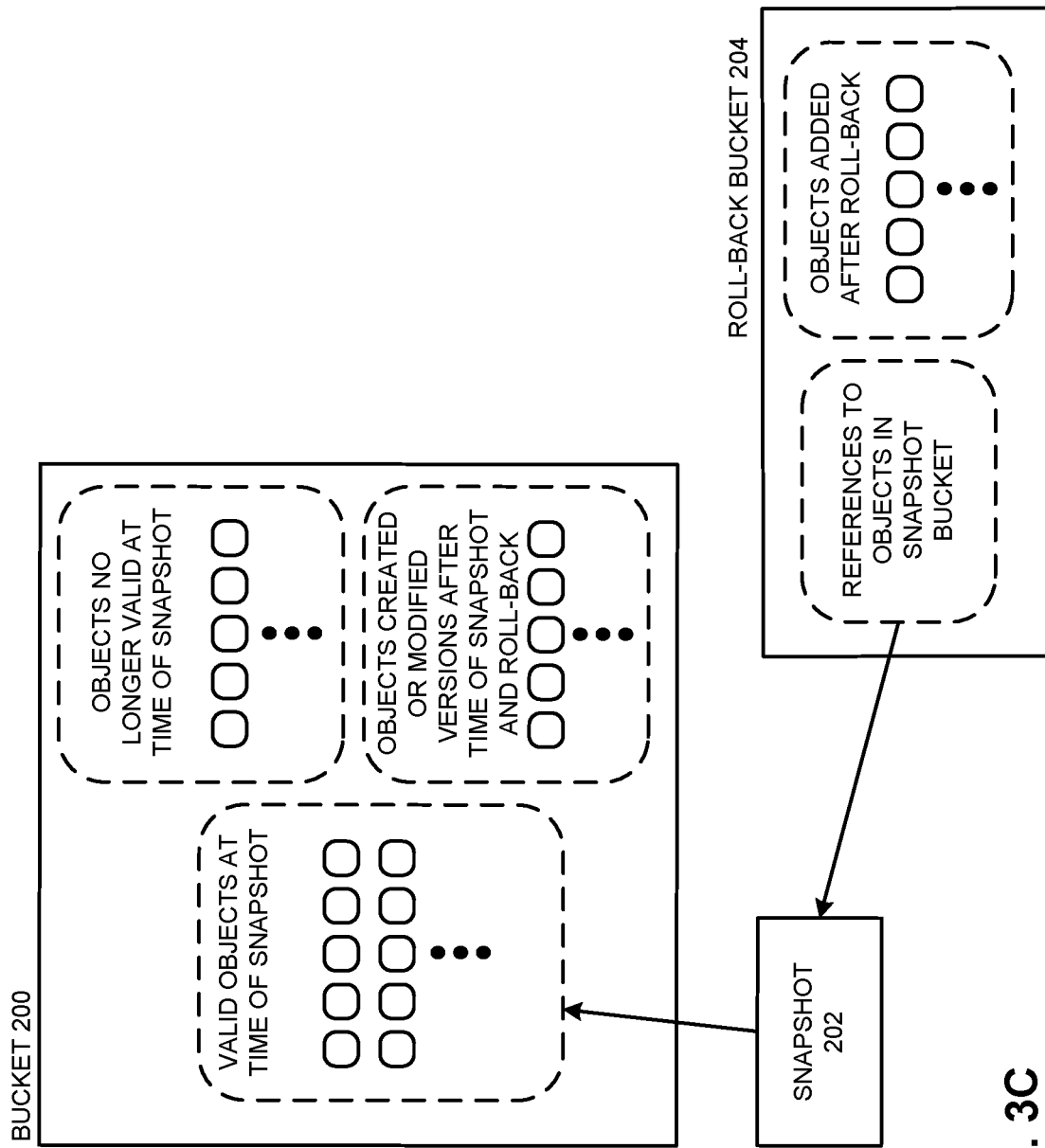
FIG. 3C illustrates a logical view of how a time-series database can logically track the set of valid object references for a roll-back operation in accordance with an embodiment.

FIG. 3C illustrates an exemplary roll-back bucket 204 in the context of the scenario illustrated in FIGS. 2 and 3A. FIG. 3C illustrates the parent /BAR bucket 210 and the snapshot bucket 202 of the /BAR bucket 200 that was taken at time X. Upon receiving a request from a client to roll back to time X, the cloud data management service creates roll-back bucket 204, which references snapshot 202 and the objects that were valid in parent bucket 200 at time X via snapshot 202. As with the clone bucket example of FIG. 3B, clients writing objects to the rolled-back context (i.e., to roll-back bucket 204) will have those objects stored in roll-back bucket 204. Note that, as described previously, many different applications may simultaneously access multiple different versions of objects, and that the request for and creation of a roll-back bucket does not prevent other clients from continuing to access the present version of objects (or other rolled-back timeframes in other snapshots and/or roll-back buckets). Other objects that are written to bucket 200 in the present time and unrelated to the rolled-back context will be written to bucket 200 and are not visible from the context of roll-back bucket 204.

The above-described snapshot, clone, and roll-back techniques involve preserving and accessing different versions of objects. Database structures are leveraged to track and manage such time-series information in a manner that would be substantially more challenging or even impossible in a traditional filesystem. The cloud data management service can also mitigate space limitations associated with preserving multiple versions of similar objects in (expensive) elastic cloud storage services using the previously-described deduplication capabilities (e.g., two objects that differ only slightly will ideally be broken into segments and/or deltas in a way that does not take substantially more space than either object individually). However, tracking a large set of objects that are stored in a cloud storage system and being accessed by a large number of geographically-distributed clients requires a high-availability, scalable database. In some embodiments, the time-series database comprises a distributed, high-availability web-scale database (e.g., Apache Cassandra).

As illustrated in FIG. 1, the time-series database is distributed across multiple management nodes to ensure that no individual node can become a single point of failure. Nodes receiving objects and/or object requests distribute tracking information for every operation to the other database nodes, and all records in the database are associated with time stamps that indicate when objects were received and/or operated upon. The distributed database may require at least three active nodes to perform operations, with each node acting as a possible point of entry for new objects and related client operations. The database nodes leverage an election-based technique that requires a quorum number of nodes to respond and acknowledge updates (and/or agree upon a record value) before committing to an update to ensure that a majority of nodes are available to make an update persistent while not requiring every node to be available (which becomes increasingly difficult as the size of the system and the number of nodes scales). Note that distributed databases offer capabilities that are different from traditional SQL databases, with some constraints being relaxed or simplified to enhance scalability (e.g., supporting SQLlite queries that provide a subset of SQL search capabilities). Note also that layering object storage capabilities on top of an existing object-based cloud storage system is distinct from building an object store on top of a filesystem (e.g., on top of a linux filesystem or a distributed filesystem such as CIFS). Traditional filesystems involve more complex infrastructure for locating data blocks (e.g. inode tables, etc), and like traditional SQL databases are limited in scalability. Tracking object metadata in a distributed database facilitates rapid look-ups of object time characteristics without the time overhead of having to scan entire object tables. For instance, search keys may include a bucket name, object name/path, and time stamp; the distributed nodes can perform such searches to quickly identify the correct versions of objects and return them to requesting clients.

Figure 6:
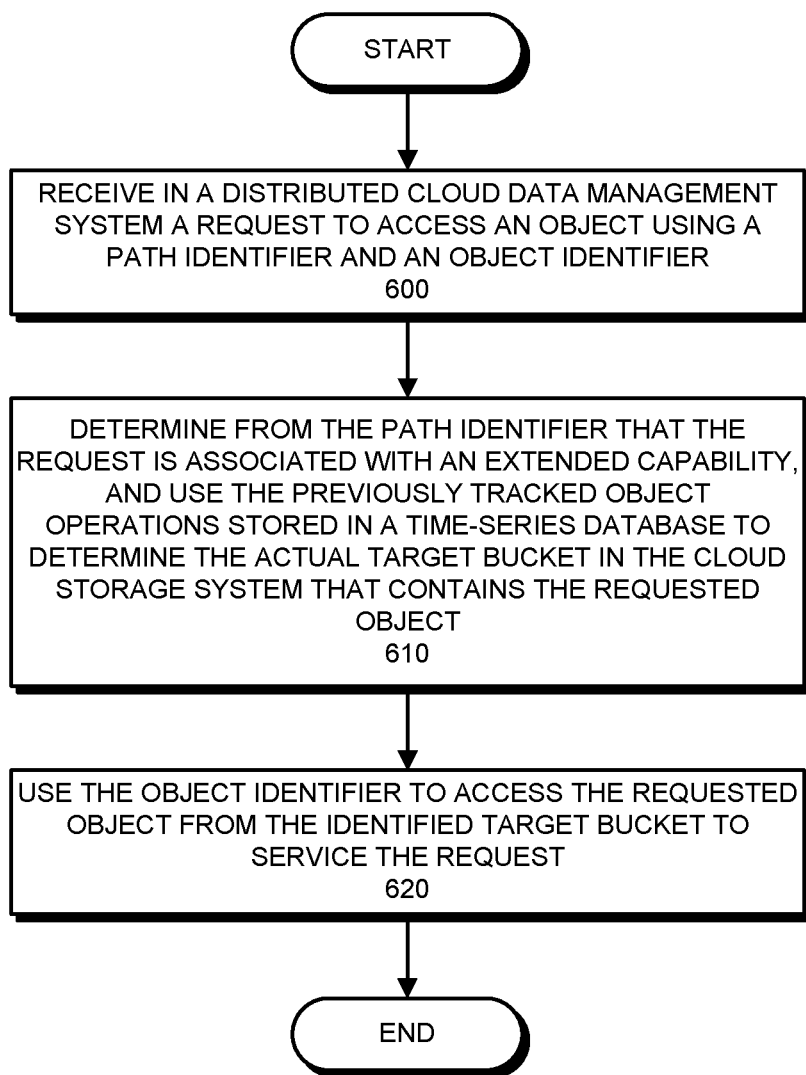
FIG. 6 presents a flow chart that illustrates the process of managing cloud-based storage using a time-series database in accordance with an embodiment.

FIG. 6 presents a flow chart that illustrates the process of managing cloud-based storage using a time-series database.

As described above, a DCDMS that is layered upon a cloud storage system presents client applications with an abstraction of buckets of stored objects and manages how these stored objects are stored in the cloud storage system. In addition, the DCDMS provides additional extended capabilities that are not directly supported by the cloud storage system. To do so, the DCDMS leverages a distributed time-series database that executes on multiple, distinct compute nodes to collectively track client object requests received by the DCDMS. During operation, the DCDMS receives a request to access an object using a path identifier and an object identifier (operation 600). The DCDMS determines from the path identifier that the request is associated with one of its supported extended capabilities, and uses the previously tracked object operations that are stored in the time-series database to determine the actual target bucket in the cloud storage system that contains the requested object (operation 610); the actual target bucket that contains the object may be different from the bucket identified in the path identifier that is received. The object identifier is then used to access the requested object from the identified target bucket to service the request (operation 620).

In some embodiments, a cloud-based data management service can be leveraged to develop and support large-scale distributed applications. Consider, for instance, a video storage and enhancement application that is executed in a cloud computing environment via the cloud-based data management service. This application may be configured to store videos and video metadata in the storage of the cloud computing environment, and allow users to tag videos with various attributes in real time, as the videos are being submitted. In some scenarios, the actual video data and attributes might be submitted using standard cloud computing interfaces, while the additional disclosed capabilities and abstractions can be invoked by developers for development, testing, and backup purposes. For instance, a developer debugging or testing an aspect of the live system (e.g., as it is currently receiving new content from users) may take a snapshot of one or more buckets to create a fixed, unchanging view of the data at a given point, thereby simplifying the analysis and debugging process (in contrast with trying to debug a system containing a constantly changing set of content). The developer may also clone such buckets to make changes and adjustments to the data for testing purposes without risking corrupting the original set of data.

Similarly, an analyst executing a system analysis workflow may also use the snapshot capability for one or more buckets to freeze and analyze the set of stored content at a given point in time. As described above, the disclosed techniques create the snapshot instantly without copying the underlying data, thereby allowing snapshots to be created and analyzed without any additional delay. The system can be also be configured to take regular snapshots for backup and recovery purposes. For instance, if the system is configured to take hourly backup snapshots, a user who accidently deletes data can, instead of losing all of their work, can roll back to the most recent snapshot to recover their data and continue from where they left off. Similarly, if at some point the application determines that the data or metadata set has become corrupted due to a failure and/or bug, the data can be rolled back to an earlier timeframe in which the dataset still had integrity. Note that this process may involve iteratively checking multiple roll-back points to perform integrity checks, or even simultaneously checking multiple roll-back points in parallel.

In summary, a cloud-based data management service can leverage a distributed database to provide additional capabilities and filesystem abstractions on top of a cloud object storage system. This distributed database can act as a time-series database that supports operations such as snapshots, cloning, and roll-backs for objects stored in buckets in the cloud storage system. The object and bucket metadata tracked in the time-series database facilitates using copy-on-write techniques that allow existing objects to be referenced from parent buckets without having to copy (and store duplicates of) objects that are created during such operations, thereby reducing the amount of space that is needed in the cloud storage system. Note that the timeline of object accesses that are stored in the time-series database enable all of the above-described functionality.

Multi-Node Management

The previous section describes a set of capabilities that can be provided to clients via a cloud data management service. While appearing to be a single logical service from the client perspective, the cloud data management service comprises multiple different services that execute simultaneously across multiple distributed management nodes (as illustrated in FIG. 1 and described above) to provide web-scale infrastructure. However, managing all of the services that are collectively provided by these distributed nodes can become complex as the number of nodes scales. In some embodiments, the cloud data management service leverages the distributed database to provide multi-node management for the service instances executing on the management nodes.

Figure 4:
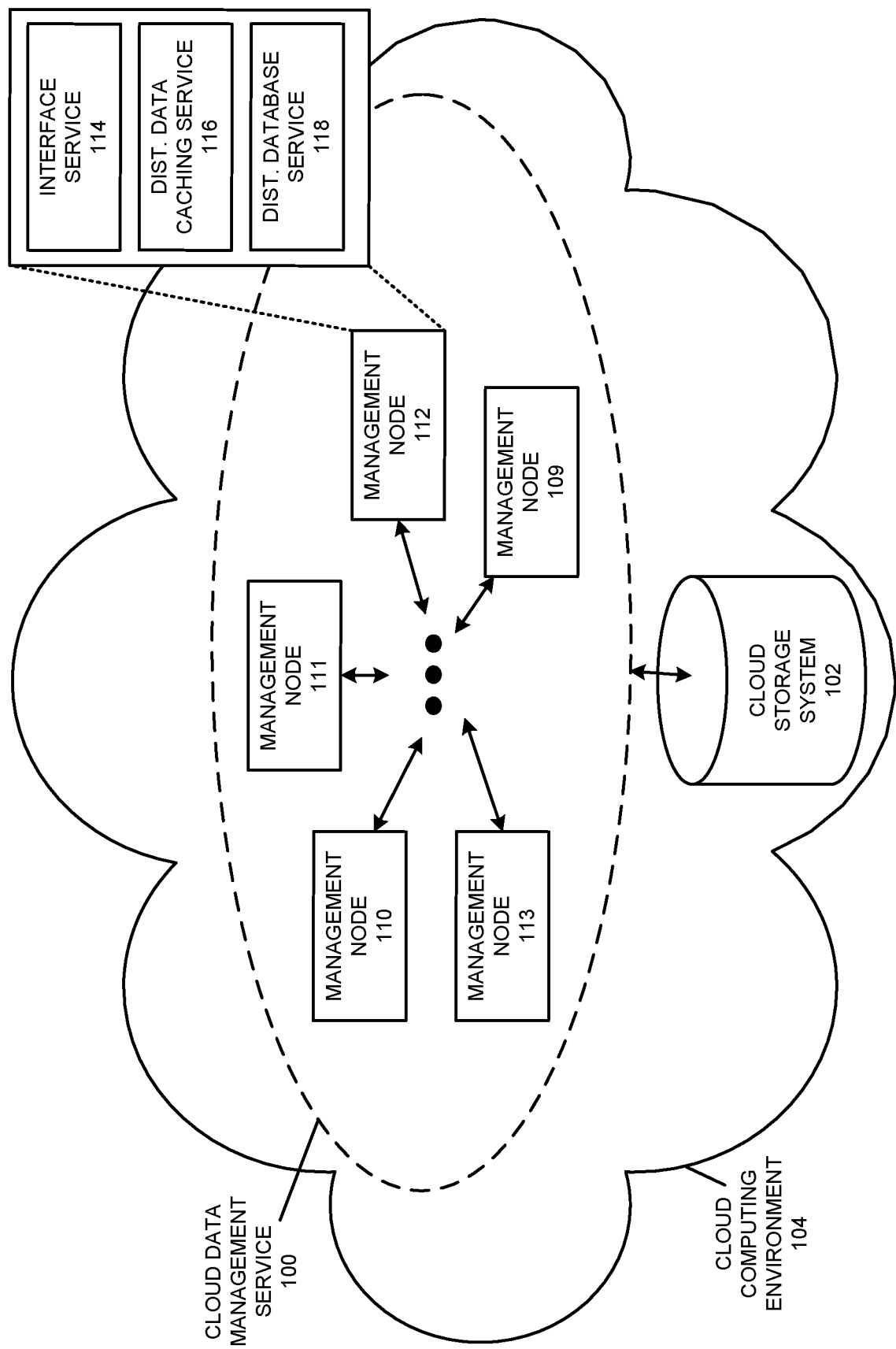
FIG. 4 illustrates a more detailed configuration of the cloud management service of FIG. 1 in accordance with an embodiment.

FIG. 4 illustrates an exemplary configuration of the cloud data management service 100 of FIG. 1 in slightly more detail, showing a larger number of management nodes 109-113. Each node executes in the context of its own virtual machine (e.g., in the context of the S3 cloud computing environment, each management node might execute as an AMI, or Amazon machine image). Note that while one illustrated management node 112 includes three services 114-118, not all of the nodes need to include all of these services nor are they limited to executing just those three services. For instance, some management nodes might execute instances of all, some, or none of these three services, and may also provide additional services (not illustrated) that support cloud data management service 100. Distributed database service instances may execute on multiple nodes, but not necessarily all of the nodes, and are configured to create, monitor, and maintain a status view of the entire cluster of management nodes and services. At any point in time, a node can query the distributed database (via any management node that is executing an instance of the distributed database) on the status of the cluster, including but not limited to:

the set of nodes that are participating in the cloud data management service, which services are executing on each node, and each node's current operating status (e.g., when each service and/or node last communicated with the cluster, progress updates, etc.);

how many and which service instances are currently executing in the cloud data management service for each specific service, which nodes (and/or sets of nodes) they are executing on, their status, and which service instance are currently collaborating with one another;

Hence, the distributed database serves as a central (but distributed!) point of view for all of the services that are provided by the cloud data management service. Note that the multi-node management capabilities of the distributed database are separate from the tables that are used to track time-series information for objects that were described in the previous section; the distributed database may be configured to have separate tables to track data for each of these two capabilities (as well as for others).

The distributed database service instances distributed across multiple nodes can communicate frequently as needed to update each other and respond to quorum confirmations (or other quorum operations); other different sets of collaborating service instances may also be configured to communicate with each other both independently or via the distributed database. How nodes and services interact can be dynamic based on the health and/or status of the distributed system as a whole. For instance, in some scenarios distributed data caching service instances may communicate among themselves directly to determine which nodes are caching requested objects. Alternatively, in some scenarios they may collectively track such information in the distributed database. For example, in one configuration the data caching service instance in a node receiving an object request from a client may query a set of object-cache tracking tables in the distributed database to determine whether it can contact a peer service instance in another management node directly to access a cached object instead of loading the object from the cloud storage system. Hence, multiple service instances that execute on sets of nodes in the cloud data management service may both communicate within their own peer group (e.g., all of the distributed data caching service instances on different management nodes communicating with each other, or the distributed database service instances located on different nodes communicating) as well as between higher-level services and other nodes (e.g., the distributed data caching service instance on one node communicating with the distributed database service instance on the same and/or another node to look-up cached objects).

In some embodiments, the multi-node management portion of the distributed database tracks pending jobs that need to be completed (e.g., in a database table that is dedicated to tracking pending and/or scheduled jobs), and nodes (e.g., a management service on each node) may be configured to periodically check this pending jobs list to determine whether there are any service instances (or "jobs") that should be initiated. In some embodiments, nodes are all considered equal, and no jobs are assigned to specific nodes; any job can execute at any node at any given time. A node considering whether to initiate a given job may consider the availability of local resources (e.g., the local CPU and available compute cycles, memory or storage size, etc), other conditions (such as location) and any specific requirements that are associated with that job. Multiple nodes may simultaneously determine that there are unclaimed jobs on (or being added to) this pending jobs list; multiple nodes attempting to initiate the same pending job can coordinate through the distributed database using global locks to determine which node will actually execute the job. For instance, multiple nodes may attempt (via the distributed database) to acquire a global lock that is needed to claim an available job, but database quorum procedures ensure that only one node actually receives the lock/permission to do so. That winning node then updates the database to indicate that it is executing the job, and proceeds to do so; the other requesting jobs that do not receive the lock detect that that specific job is no longer pending and abandon their request.

Note that nodes and services in the cloud data management service may be unaware of what many or even the majority of the other nodes and services in the system are doing at any given moment—while a set of peer services executing on a set of nodes may collaborate to provide a specific service, generally services do not receive point-to-point updates from all of the other services on their host nodes or other nodes. If additional information about any other service(s) is needed, a service and/or node can contact the distributed data service (via any node executing a distributed database service instance) to submit a query and receive the requested information and/or updates. For instance, an overloaded service on a node might submit via the distributed database a request to have additional services of the same type be instantiated on different nodes, e.g. by acquiring a lock (to ensure that other services of the same type or other services in general do not collide when submitting requests in parallel) and adding a job request to the pending jobs list. The distributed database tracks and maintains up-to-date status information for the cluster, and can serve as a scalable central point for requests and logging of needs and current operations.

Multi-node management tasks execute in parallel with services that actually receive and respond to client requests (i.e., management services execute in addition to the actual workload that is being performed by the cluster in response to incoming client requests). In some embodiments, distributed services that are used to monitor, manage, and maintain the cluster include, but are not limited to per-node service management (e.g., monitoring which services are executing on a given node and determining whether more can be initiated), monitoring, high availability, garbage collection, replication, policy enforcement, backup, search/indexing, and logging services.

In some embodiments, a set of monitoring services may collaborate to monitor for and handle service failures and ensure high availability for the cloud data management service. For instance, this set of services may maintain a tracking table in the distributed database that lists the set of active nodes and services, which services nodes are respectively executing, and when both nodes and specific services last interacted with the distributed database (e.g., by periodically scanning logs to see the last time a node or service initiated a job, completed a job, queried the distributed database for information, participated in a database quorum operation, etc.). Such services can ping nodes and/or services that have not shown any activity in a recent timeframe, and if there is no response, flag a possible failure. One possible response to failure would be to queue a set of replacement jobs on the pending job list (in the distributed database), so that any failed services can be restarted on new, operational nodes if needed. Using the distributed database (and its locking mechanisms) as a mediator for performing such operations ensures that multiple nodes do not interfere with each other by trying to initiate the same fail-over response simultaneously.

In some embodiments, a policy management service acts as a policy agent to track and enforce a set of policies that have been defined for the cluster. For instance, administrators may set policies for a range of different parameters including, but not limited to, replication, levels and granularity of deduplication (including possibly disabling deduplication), backups, logging, and garbage collection. Multiple instances of the policy management service operate as a distributed policy management system that enforces such policies; new nodes or services can query the policy management service to receive a set of policy instructions, and the policy management service can check to confirm that policies are being adhered to by analyzing other services' outputs via the distributed database. Note that managing service replication for the cluster may involve both monitoring and policy. For instance, a policy may specify how to increase the number of replicated service instances for one or more difference services as the overall set of services and nodes in the cluster grows, to ensure that high availability is maintained. Hence, the policy management service may also be configured to track the number, proportion, and workload of service instances in the cluster, and initiate new instances of services (via the above-described pending jobs list) as needed or flag that more nodes are needed to maintain a service availability level or ratio specified by a policy.

In some embodiments, a set of garbage collection services work cooperatively to remove obsolete or unneeded data from the cloud storage system and cloud data management service. For instance, in the context of the object storage capabilities described in the previous section, a policy may specify how long old versions of objects should be stored in the cloud storage system. In some scenarios, the policy may specify that older versions of objects should remain persistent as long as they are referenced by a snapshot. The garbage collection services can scan the distributed database to determine any unreferenced objects that are still stored in the cloud storage system or cached in any nodes, delete such objects from their respective buckets, and then update the distributed database to reflect these changes. In some embodiments, the garbage collection services might instead reduce storage costs by moving older versions of objects into secondary storage (e.g., persistent storage on nodes or outside of the cloud instead of in a more expensive cloud storage system) and updating the distributed database to reflect these changes. Note that multiple garbage collection services executing on different nodes can leverage the distributed database to collaboratively perform such operations, for example by cooperatively using the distributed database to claim and identify different portions of the object space that they will be scanning and operating upon.

In some embodiments, the same cluster of management nodes may support multiple distinct distributed database instances that manage data for different clients. For instance, each management node may host multiple distributed database service instances that do not interact with each other. For example, such services might not have overlapping tasks and hence never operate upon the same set of shared data even if they are supporting the same set of clients, or potentially might even operate upon completely different data sets while applying different policies for completely different sets of clients. A given node might also execute multiple distinct database instances that are associated with different sets of data being accessed by distinct sets of clients and applications. Whenever a new service is initiated on a given node it is configured with a specific set of contact information that includes enough look-up information to access its associated distributed database and peer services if needed. Over time such services can gather more such information (e.g., from the distributed database) to ensure that they can re-establish contact across node failures if needed.

Figure 9:
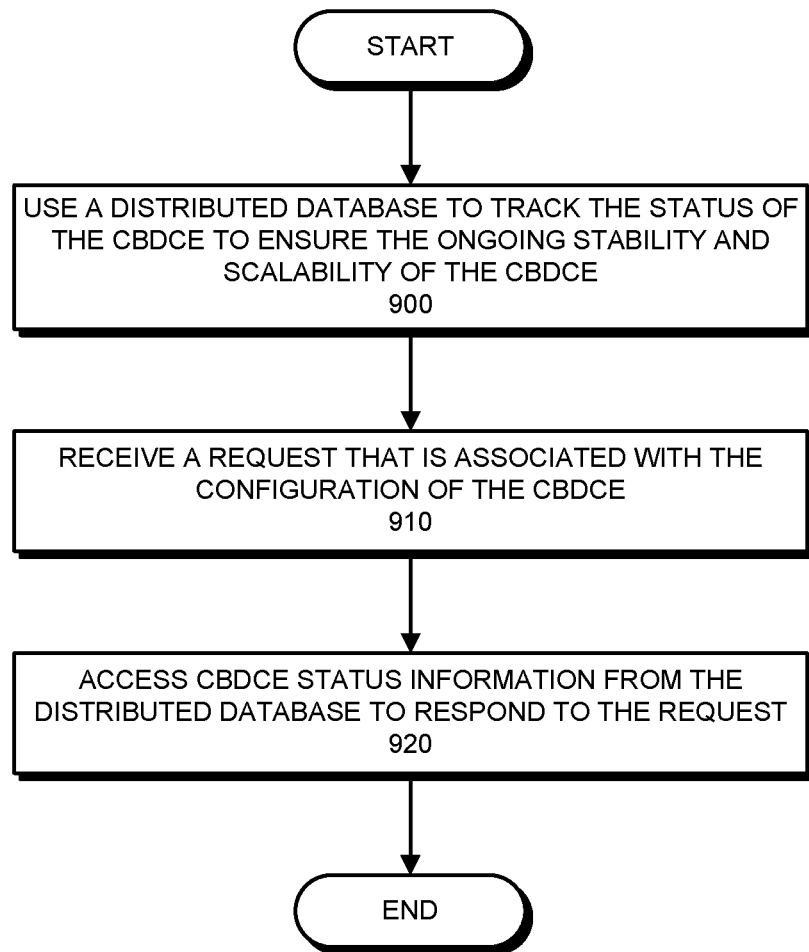
FIG. 9 presents a flow chart that illustrates the process of managing a cloud-based distributed computing environment that comprises multiple geographically-distributed compute nodes in accordance with an embodiment.

FIG. 9 presents a flow chart that illustrates the process of managing a cloud-based distributed computing environment that comprises multiple geographically-distributed compute nodes. Multiple services simultaneously execute on the CBDCE compute nodes, with each service comprising multiple service instances that simultaneously execute on multiple distinct compute nodes of the CBDCE. During operation, the system uses a distributed database to track the status of the CBDCE to ensure the ongoing stability and scalability of the CBDCE (operation 900). Upon receiving a request that is associated with the configuration of the CBDCE (operation 910), a service accesses CBDCE status information from the distributed database to respond to the request (operation 920).

Distributed Journal Service

In some embodiments, the distributed nodes of the cluster support a distributed journal service that ensures that new data received by nodes cannot be lost due to a node failure before it is written persistently to the cloud storage system. For instance, because of the nature of the distributed nodes and distributed database, there may be some time delay after a given node has received new data from a client but is still waiting for requests to be confirmed by a quorum set of distributed database nodes; during such intervals this receiving node becomes a single point of failure and is vulnerable to node, network, and/or other failures could cause such new data to be lost. Hence, multiple nodes in the cluster are configured to act as a distributed log that can persistently log and preserve incoming data to prevent loss in case of failures or errors. The distributed log leverages persistent storage on each of the nodes executing a logging service to provide a shared storage pool that can be written to by any service that needs logging services. Note that this is distinct from a dedicated logging server, which would involve dedicated, specially-allocated storage space that could not be applied to other purposes even when idle. Instead, a large number of journaling service instances on multiple nodes, each of which has only limited individual space, can combine to provide an adaptable, scalable journal service without requiring special resources (e.g., additional dedicated storage hardware). The number of nodes and service instances allocated to journaling can be adjusted dynamically based on the number of requests and amount of space needed.

Figure 5:
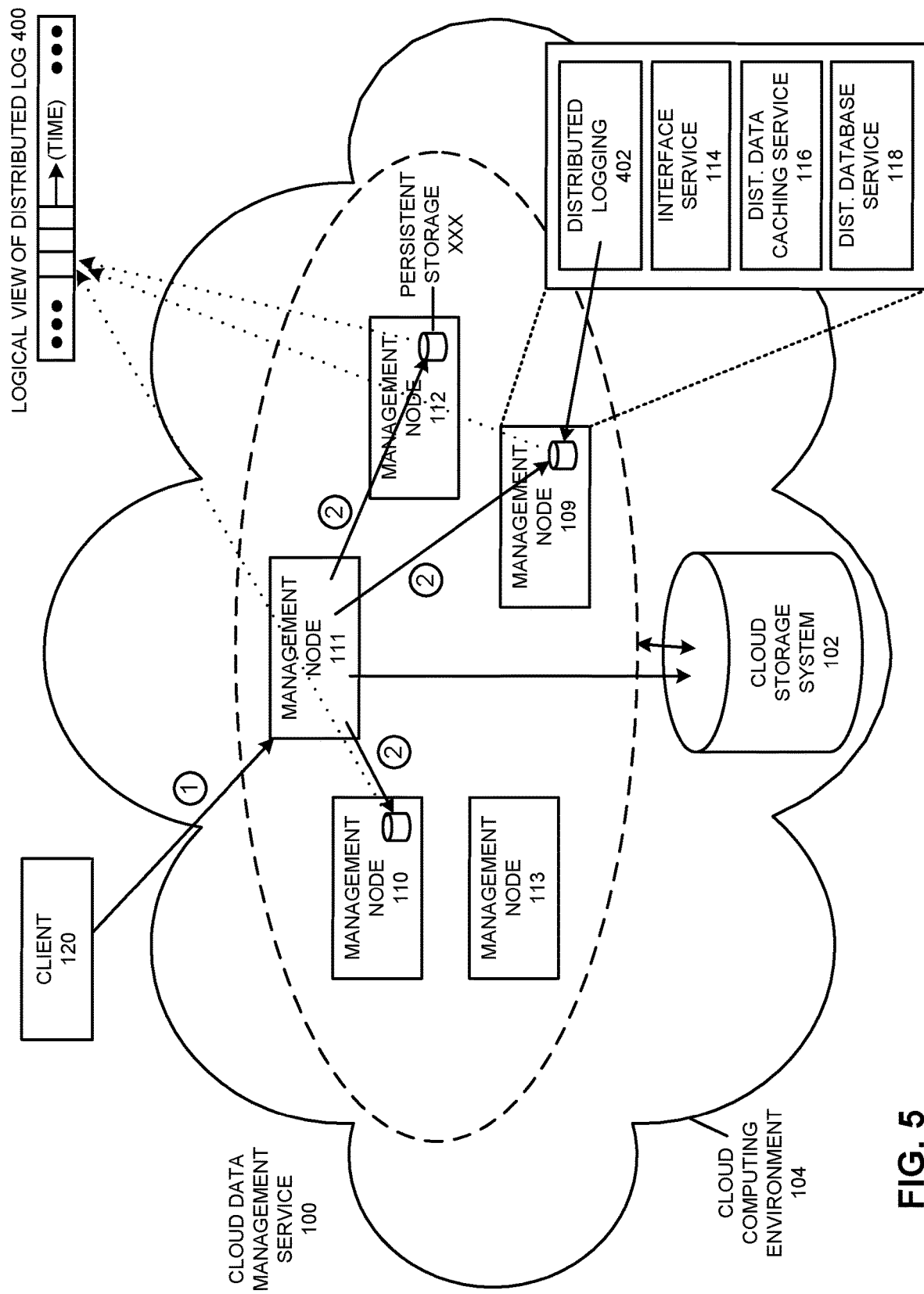
FIG. 5 illustrates a logical view of a distributed log for the cloud management service in accordance with an embodiment.

FIG. 5 illustrates a scenario in which several management nodes (109, 110, and 112) also execute a distributed logging service 402 that can log data to persistent storage that is local to the respective management node executing the logging service. If needed, the contents of these logs can be reconstructed to recreate new data that was lost—FIG. 5 illustrates a logical view of distributed log 400, which does not exist as a contiguous physical entity in the cluster but illustrates the notion of the contents of the distributed logs that could be pieced into a single contiguous log if needed. In the scenario illustrated in FIG. 5, a client 120 is writing new data to management node 111 (Operation 1). In parallel with performing a set of operations (not shown) that are needed to add the new data to cloud storage system 102 (e.g., update the distributed database, ensure quorum receipt, etc.), management node 111 also logs the new data and transaction information to the distributed logging services 402 executing on management nodes 109, 110, and 112 (Operation 2). Logging new data in parallel to multiple logging nodes ensures that the new data remains safe and available across a range of failures; the number of duplicate log destinations may depend on the scale of the cluster, the importance of the data being logged, and/or other factors, and may be specified by a policy agent service (described above) and/or service-level agreement. The node requesting to log data may also confirm (and ensure) that it has received acknowledgements that the requested data has been successfully stored by a quorum number of logging nodes. A record of logging transactions may also be written to the distributed database.

In the case a monitoring service detects a node failure (e.g., the failure of management node 111), a recovery service can be initiated to look-up, analyze, and recover transactions and recover data that was logged by the failed node. For instance, the recovery service might be configured to search in the distributed database for log records that are associated with the failed node's identifier and then contact logging services to reconstruct and properly process and store any data that was not successfully processed before the failure. Ideally, such recovery efforts would typically only be needed infrequently in error/failure situations.

In some embodiments, each instance of distributed logging service 402 is associated with some form of persistent storage that can store data across power failures (e.g., a solid state drive or other non-volatile storage device). For instance, an instance might be either a virtual or physical machine executing in a cloud data center or elsewhere, as long as the instance is associated with some interface that ensures that it can write to persistent storage. In some scenarios a logging service may even include a dedicated physical storage unit in a data center or leverage an additional (distinct) cloud storage system. Parameters such as availability, storage size, read and write latency, and network or storage bandwidth can be factors both for nodes choosing logging targets as well as for nodes that are determining whether to instantiate a distributed logging service locally. For example, log data may be written in same-sized increments (e.g., 2 Gbyte chunks) that are indexed using the distributed database (both for search/look-up purposes if needed after a failure as well as for later garbage collection). Logged data is only needed for a certain timeframe; after all of the data in one of these chunks has been confirmed to be successfully flushed to a cloud storage system (or some other high-reliability and/or redundant backend storage system), the logged version of the data is no longer needed and the chunk can be freed on the logging nodes using a background garbage collection service so that the space can be re-used for other subsequent log operations. Maintaining and clearing old content from the distributed log facilitates maintaining the abstraction of an infinite storage journal that any requesting service can stream data to on an ongoing basis.

In some embodiments, a monitoring service can be configured to track the status of available log space and throughput capacity and either trigger deletes or the instantiation of additional logging service instances as needed. For instance, logging services may leverage a shared table in the distributed database to track their peers' respective status, load, availability, and other information. Management nodes seeking to initiate logging operations may select specific target logging services based on such information, for instance in the process taking care that they are not logging to two distributed logging services that reside on the same management node (which would somewhat defeat the purpose of distributed logging).

In some embodiments, data that is being freed from the distributed journaling service can be flushed to a backend storage system. For instance, journaled data may be flushed to a cloud storage system or one or more dedicated storage devices. Metadata associated with this flushed data may also be written to the distributed database to enable subsequent accesses to this flushed data as needed. Such flushing options and capabilities may be incorporated into the garbage collection service or into a separate distributed flushing service. In some implementations, the instances of the responsible service may coordinate among themselves (e.g., via the distributed database) to ensure that the data is flushed reliably without duplication, and then mark data that has been flushed and can be garbage collected. Using such techniques, all user data input can be logged and kept as needed/desired. Administrators may define a system policy that specifies parameters such as how long such user data should be logged, the level of redundancy, the set of backend storage systems, etc.

Figure 10:
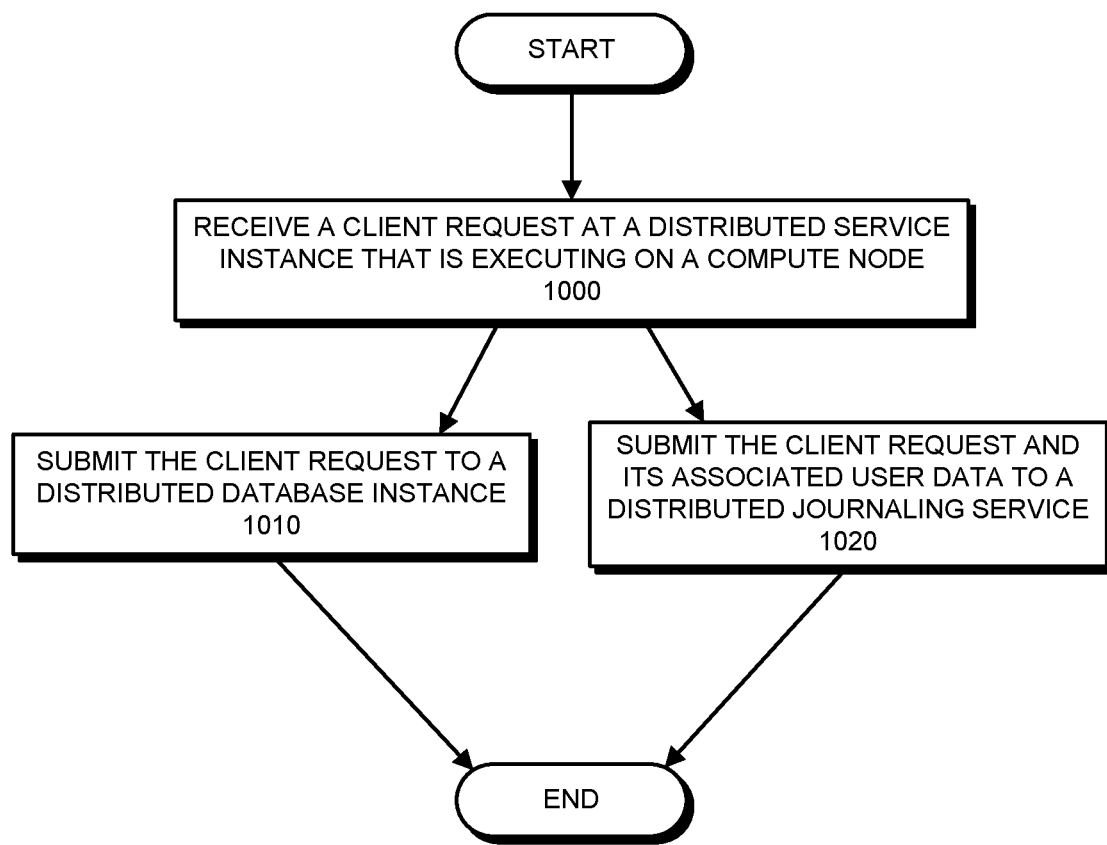
FIG. 10 presents a flow chart that illustrates the process of journaling data received in a cloud-based distributed computing environment in accordance with an embodiment.

FIG. 10 presents a flow chart that illustrates the process of journaling data received in a cloud-based distributed computing environment. Multiple services simultaneously execute on the CBDCE compute nodes, with each service comprising multiple service instances that simultaneously execute on multiple, distinct compute nodes of the CBDCE. The CBDCE includes a distributed database that enables coordination between the service instances of services that execute in the CBDCE; this distributed database also includes multiple distributed database instances that simultaneously execute on multiple different CBDCE compute nodes. During operation, a service instance executing on one of these compute nodes receives a client request (operation 1000). The service instance submits this client request to a distributed database instance (operation 1010) and, in parallel, also submits the client request and its associated user data to a distributed journaling service (operation 1020).

In summary, a distributed journaling service ensures that new data and requests that are being received by the cloud data management service are logged and can be recovered across a range of possible errors or failures. This distributed journaling service can be leveraged by all of the other services executing in the cluster, enabling them to simultaneously log to multiple different nodes to ensure that the new data is protected. A separate garbage collection process can leverage the distributed database to determine and clear out log data that is no longer needed, thereby ensuring that the instances of the journaling service have an abstraction of unlimited log space.

Elastic Search

In some embodiments, a multi-node cluster that includes the above-described multi-node management techniques (and possibly also leverages a time-series database) is used to provide distributed elastic search capabilities. For instance, multiple nodes in the cluster may be configured to execute instances of an existing application such as the elasticsearch distributed search engine to organize, manage, and provide search capabilities for a set of data (e.g., a set of data for an enterprise). Such an existing application may include its own internal cluster-based database to manage search data, but then have the data files that store this internal database be managed by the multi-node management system using the distributed time-series database (e.g., the actual data files and the metadata for the data files used by the elastic search application might be stored redundantly across the cluster in a manner that is managed and synchronized using the time-series database).

Consider, for instance, the previously-mentioned video search application that executes in the cloud computing environment. In one embodiment, video tags are metadata that is associated with videos that are being recorded and/or processed. For instance, video tags may be attached to a video or one or more portions of a video to identify a geographic location, a timeframe, a person's name, or to identify anything else in the video that might be searched for (i.e., looked up) at a later time. The video tags (along with references to their specific associated video segments) from a large number of videos might be read, parsed, and then organized into an index by the elasticsearch instances. Subsequent video searches can then access this index to search for matching videos based on a range of search keys and filters.

Note that such an application may be structured in a range of different ways. For instance, in some embodiments the cluster may store both the videos and the video metadata. Alternatively, other infrastructure may be used to store the video, and the cluster only maintains the metadata and search capabilities. In some embodiments, a hybrid approach enables videos to be stored both in the cluster as well as in externally-managed infrastructure. Because the system is decentralized and distributed, there are no scalability constraints; the tags for a wide range (and location) of videos can be combined into a combined index that enables a user to search upon the full namespace of all of the videos, with the search output indicating the location(s) of the search results. A user searching for videos may be directed to and connect to a graphical user interface (GUI) presented by an elasticsearch instance in the cluster; upon entering the desired video tags, the elasticsearch instance initiates a distributed search and returns any results via the GUI.

While the above-described examples describe video tags and video search, similar techniques can be used to perform deep content search on any type of data. Furthermore, other distributed applications can be executed in the cluster similarly (and also simultaneously), supported by the multi-node management system and the time-series database, which manages their configuration, data files, etc.

Computing Environment

Figure 7:
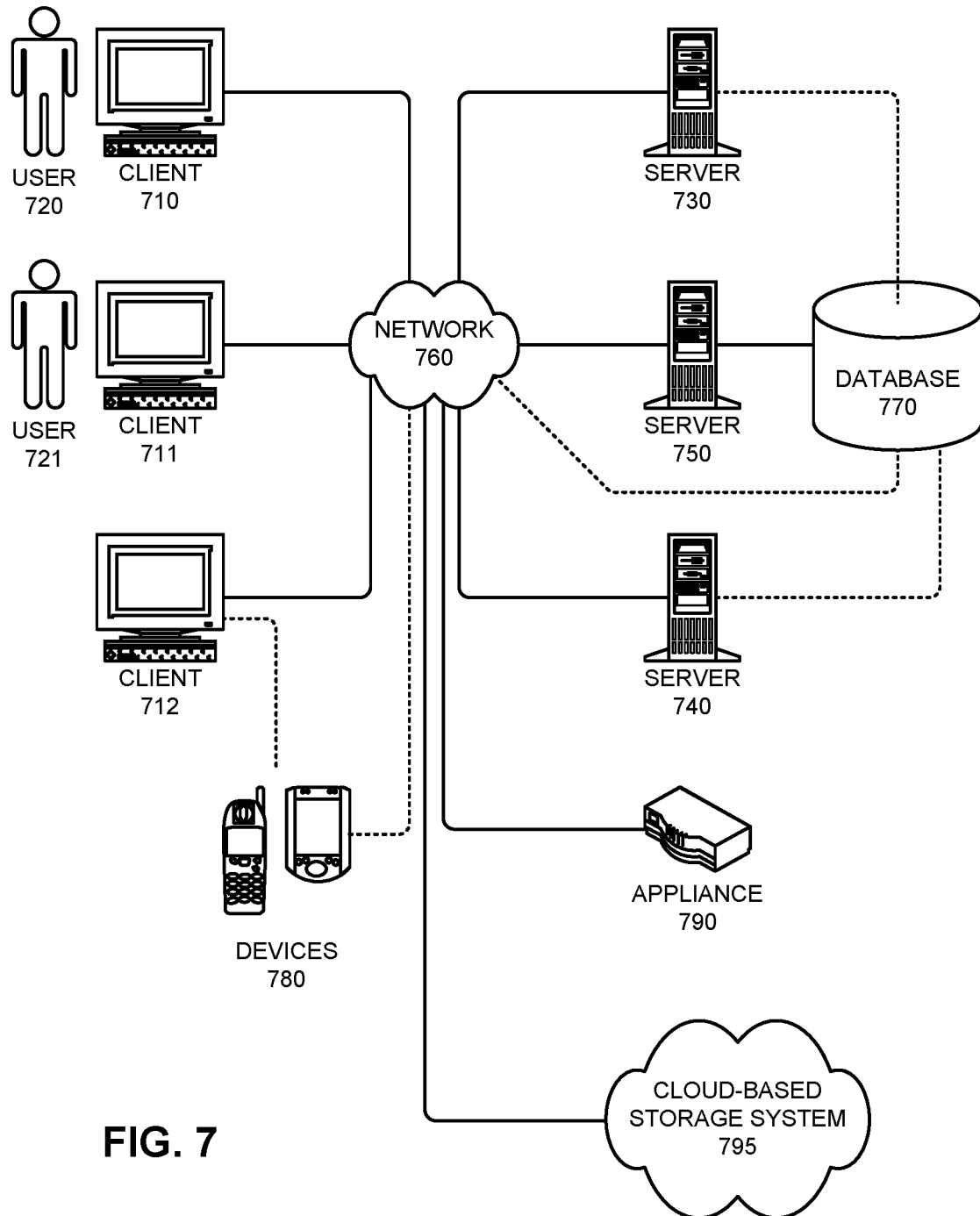
FIG. 7 illustrates a computing environment in accordance with an embodiment.

In summary, embodiments of the present invention facilitate storing and managing data in a cloud computing environment. In some embodiments of the present invention, techniques for managing and/or accessing data stored in a cloud computing environment can be incorporated into a wide range of computing devices in a computing environment. For example, FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, appliance 790, and cloud-based storage system 795.

Clients 710-712 can include any node on a network that includes computational capability and includes a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. For instance, computing environment 700 can include a large number of compute nodes that are organized into a computing cluster and/or server farm. In one embodiment of the present invention, server 740 is an online "hot spare" of server 750.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. Alternatively, other entities in computing environment 700 (e.g., servers 730-750) may also store such data. Database 770 may also be a distributed time-series database.

Devices 780 can include any type of electronic device that can be coupled to a client, such as client 712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Cloud-based storage system 795 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 700. In general, any device that includes computational and storage capabilities may incorporate elements of the present invention.

Figure 8:
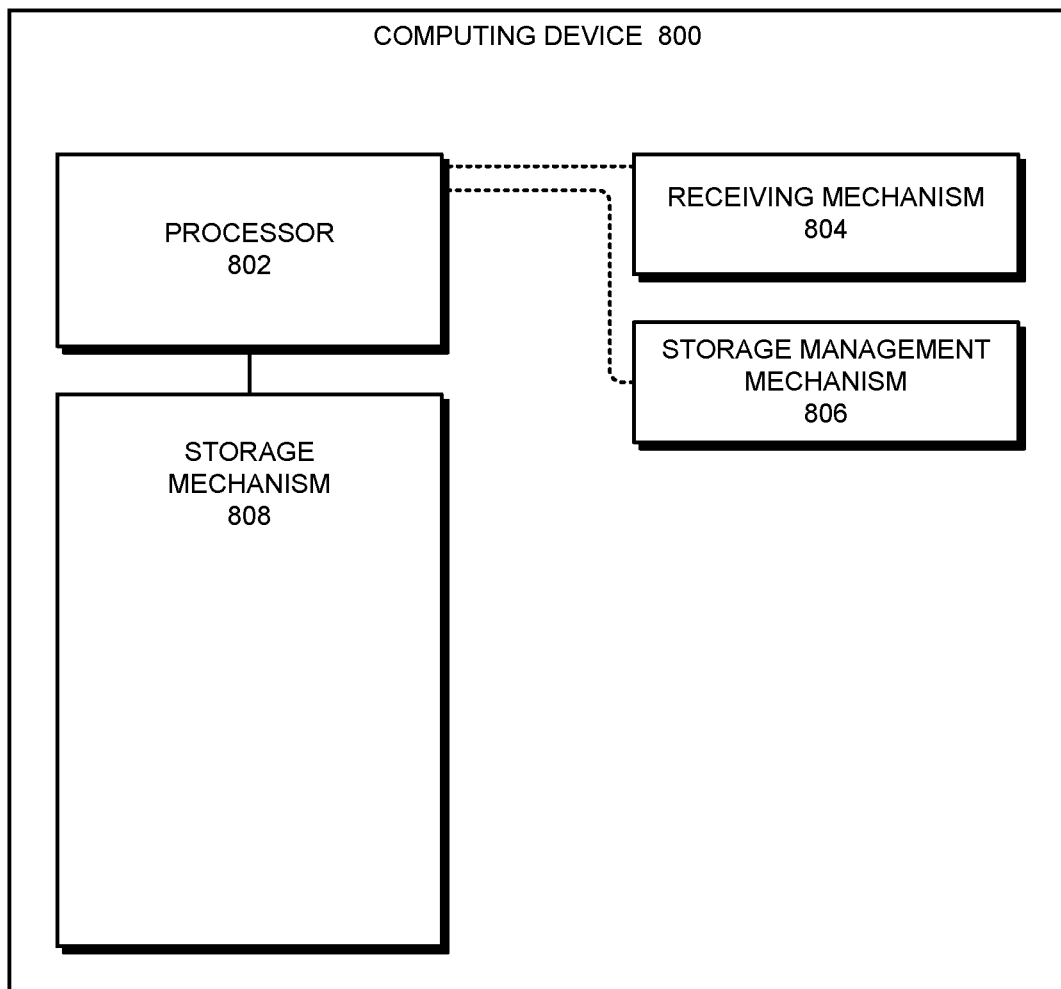
FIG. 8 illustrates a computing device in accordance with an embodiment.

FIG. 8 illustrates a computing device 800 that includes a processor 802. Computing device 800 also includes a receiving mechanism 804, a storage management mechanism 806, and a storage mechanism 808.

In some embodiments, computing device 800 uses receiving mechanism 804, storage management mechanism 806, and storage mechanism 808 to manage data in a cloud computing environment. For instance, storage mechanism 808 can store distributed database data that is associated with tracking the status and/or configuration of the cloud-based distributed computing environment, or to store data that is being logged for a distributed journaling service. Computing device 800 can use receiving mechanism 804 to receive a request to determine the status of the CBDCE or to recover (or delete) data that was logged by the distributed journaling service. Program instructions executing on processor 802 can be used to configure and access status information for the CBDCE and to perform journaling. Storage management mechanism 806 can coordinate with other management nodes and a cloud storage system to provide further second-tier storage capabilities and for redundancy.

In some embodiments of the present invention, some or all aspects of receiving mechanism 804, storage management mechanism 806, and/or a filesystem device driver can be implemented as dedicated hardware modules in computing device 800. These hardware modules can include, but are not limited to, processor chips, application-specific integrated circuit (ASIC) chips, field-programmable gate arrays (FPGAs), memory chips, and other programmable-logic devices now known or later developed.

Processor 802 can include one or more specialized circuits for performing the operations of the mechanisms. Alternatively, some or all of the operations of receiving mechanism 804, storage management mechanism 806, and/or a filesystem device driver may be performed using general-purpose circuits in processor 802 that are configured using processor instructions. Thus, while FIG. 8 illustrates receiving mechanism 804 and/or storage management mechanism 806 as being external to processor 802, in alternative embodiments some or all of these mechanisms can be internal to processor 802.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for journaling data received in a cloud-based distributed computing environment (CBDCE), the method comprising:
receiving at a service instance a client request that includes a set of user data, wherein the CBDCE comprises multiple geographically-distributed compute nodes that simultaneously execute multiple services, wherein each service comprises multiple service instances that simultaneously execute on multiple distinct compute nodes of the CBDCE, wherein the service instance is an instance of a specific service and is executing on a specific CBDCE compute node, wherein the CBDCE includes a distributed database that enables coordination between the service instances of one or more services that execute in the CBDCE, wherein the distributed database comprises a set of multiple distributed database instances simultaneously executing on multiple different CBDCE compute nodes, wherein the CBDCE includes a distributed journaling service comprising multiple distributed journaling service instances that journal data being stored in the CBDCE;
submitting the client request to a distributed database instance executing on a second CBDCE compute node that is distinct from the specific CBDCE compute node; and
in parallel with submitting the client request to the distributed database instance, submitting the client request and the set of user data to three or more journaling service instances from the distributed journaling service that execute on distinct CBDCE compute nodes that are also distinct from the specific CBDCE compute node and the second CBDCE compute node;
wherein each journaling service instance from the distributed journaling service is configured to use the distributed database to track its storage capacity and a set of logged data that the respective journaling instance is currently storing;
wherein a monitoring service, upon determining the client request has been successfully received by the distributed database instance and processed, scans a set of distributed database records associated with the distributed journaling service to identify and contact all journaling service instances journaling data associated with the client request to flush duplicated journal data associated with the client request from the distributed journal service.

2. The computer-implemented method of claim 1,
wherein submitting the client request to the distributed database instance comprises waiting for a quorum of the set of multiple distributed database instances to confirm the client request;
wherein the client request and the set of user data are vulnerable to irrecoverable loss if one or more of following fail prior to the confirmation of the client request by the quorum of the set of multiple distributed database instances: (1) the specific CBDCE compute node; (2) the service instance; and (3) a network connection associated with the specific CBDCE compute node; and
wherein submitting the client request and the set of user data to the distributed journaling service ensures that the client request and the set of user data would survive such failures.

3. The computer-implemented method of claim 2,
wherein each journaling service instance from the distributed journaling service leverages persistent storage available on its respective CBDCE compute nodes to log client requests and associated user data; and
wherein the multiple journaling service instances collectively provide a shared storage pool that written to by any service executing in the CBDCE that needs logging services.

4. The computer-implemented method of claim 3, wherein a number of the multiple journaling service instances executing on distinct CBDCE compute nodes is adjusted dynamically based on number and size of the logging requests that are collectively received and/or predicted by the distributed journaling service at a given instance in time.

5. The computer-implemented method of claim 4, wherein the multiple journaling service instances leveraging limited amounts of general-purpose persistent storage available locally on their CBDCE nodes combine to provide a scalable distributed journal service without requiring additional, specialized dedicated storage resources.

6. The computer-implemented method of claim 4,
wherein the monitoring service accesses the distributed database records to ensure that throughput and capacity of the distributed journaling service scale based on demand; and
wherein the monitoring service monitors an overall set of available log space available in the CBDCE and a current logging load to instantiate additional or release existing journal service instances based on current logging needs in the CBDCE.

7. The computer-implemented method of claim 6, wherein a policy agent service specifies an amount of redundancy needed for logging based on at least one of topography and scale of cluster and importance of the set of user data that is being logged; and
wherein the service instance is configured to submit the client request and the set of user data redundantly in parallel to a specified number of multiple journaling service instances to reduce probability of losing the logged data due to failures.

8. The computer-implemented method of claim 1, wherein each journaling service instance in the distributed journaling service stores and periodically updates a set of journaling performance parameters to the distributed database that comprise availability, storage size, read and write latency, network bandwidth, and storage bandwidth of a given journaling service instance and its host CBDCE compute node
wherein the method further comprises periodically contacting the distributed database instance to retrieve the set of journaling service performance parameters and determine an optimal set of journaling service instances that match a specified journaling need and a location of the service instance;
selecting the three or more journaling service instances from the optimal set of journaling service instances.

9. The computer-implemented method of claim 6, wherein the method further comprises detecting a failure in at least one of the specific CBDCE compute node, the service instance, or the network connection and recovering the client request and the set of user data from the distributed journaling service.

10. The computer-implemented method of claim 9, recovering the client request and the set of user data from the distributed journaling service comprises:
instantiating a recovery service that recovers client requests and user data that were affected by the failure;
wherein the recovery service is configured to:
access the distributed database records associated with the distributed journaling service to determine a set of log records that are associated with identifiers of failed nodes and service instances;
contact journal service instances that are storing the set of log records to reconstruct and process any client requests that were not successfully completed before the failure.

11. The computer-implemented method of claim 6, wherein the logged user data and the client requests are only needed for a limited timeframe;
wherein after the client request has been processed and any results have been successfully written to a high-reliability storage system, the logged data is freed from the distributed journaling service using a distributed background garbage collection service that scans the distributed database records that are associated with the distributed journaling service to free up logged data that is no longer needed, thereby enabling an abstraction of a journaling service with infinite storage space.

12. The computer-implemented method of claim 1, wherein the monitoring service is configured to:
flush logged data that is no longer actively needed from the journaling service instances to a separate dedicated storage device for tracking purposes, wherein the monitoring service scans the set of distributed database records associated with the distributed journaling service to ensure that multiple duplicates of journaled data associated with the client request are deleted and only a single instance of the journaled data associated with the client request is written to the separate dedicated storage device; and
write metadata that indexes location of the flushed logged data in the separate dedicated storage device to the distributed database to facilitate future lookups of logged client requests and user data.

13. A non-transitory computer-readable storage medium storing instructions that when executed by a computer cause the computer to perform a method journaling data received in a cloud-based distributed computing environment (CBDCE), the method comprising:
receiving at a service instance a client request that includes a set of user data, wherein the CBDCE comprises multiple geographically-distributed compute nodes that simultaneously execute multiple services, wherein each service comprises multiple service instances that simultaneously execute on multiple distinct compute nodes of the CBDCE, wherein the service instance is an instance of a specific service and is executing on a specific CBDCE compute node, wherein the CBDCE includes a distributed database that enables coordination between the service instances of one or more services that execute in the CBDCE, wherein the distributed database comprises a set of multiple distributed database instances simultaneously executing on multiple different CBDCE compute nodes, wherein the CBDCE includes a distributed journaling service comprising multiple distributed journaling service instances that journal data being stored in the CBDCE;
submitting the client request to a distributed database instance executing on a second CBDCE compute node that is distinct from the specific CBDCE compute node; and
in parallel with submitting the client request to the distributed database instance, submitting the client request and the set of user data to three or more journaling service instances from the distributed journaling service that execute on distinct CBDCE compute nodes that are also distinct from the specific CBDCE compute node and the second CBDCE compute node;
wherein each journaling service instance from the distributed journaling service is configured to use the distributed database to track its storage capacity and a set of logged data that the respective journaling instance is currently storing;
wherein a monitoring service, upon determining the client request has been successfully received by the distributed database instance and processed, scans a set of distributed database records associated with the distributed journaling service to identify and contact all journaling service instances journaling data associated with the client request to flush duplicated journal data associated with the client request from the distributed journal service.

14. A system for a cloud-based distributed computing environment (CBDCE), wherein the CBDCE comprises multiple geographically-distributed compute nodes that simultaneously execute multiple services, wherein each service comprises multiple service instances that simultaneously execute on multiple distinct compute nodes of the CBDCE, wherein the CBDCE includes a distributed journaling service comprising multiple distributed journaling service instances that journal data being stored in the CBDCE, wherein the system comprises:
- the distributed journaling service;
- a monitoring service; and
- a compute node comprising:
  - a processor that supports executing multiple different service instances in distinct virtual machines; and
  - a storage management mechanism;
- wherein the compute node is configured to use the processor to execute a service instance of a distributed service;
- wherein the service instance receives a client request that includes a set of user data;
- wherein the service instance submits the client request to a distributed database instance executing on a second CBDCE compute node that is distinct from the compute node; and
- wherein the service instance submits the client request to the storage management mechanism which, in parallel to the submission of the client request to the distributed database instance, submits the client request and the set of user data to three or more journaling service instances from the distributed journaling service that execute on distinct CBDCE compute nodes that are distinct from the compute node and the second CBDCE compute node;
- wherein each journaling service instance from the distributed journaling service is configured to use the distributed database to track its storage capacity and a set of logged data that the respective journaling instance is currently storing;
- wherein the monitoring service, upon determining the client request has been successfully received by the distributed database instance and processed, scans a set of distributed database records associated with the distributed journaling service to identify and contact all journaling service instances journaling data associated with the client request to flush duplicated journal data associated with the client request from the distributed journal service.

* * * * *